(No Model.)

C. D. SMITH.
DRAFT EQUALIZER.

No. 372,091. Patented Oct. 25, 1887.

Witnesses
James D. Griswold
M. J. Roach

Inventor
Coe D. Smith
by his attorneys
Gifford & Brown

UNITED STATES PATENT OFFICE.

COE D. SMITH, OF SMITHTOWN BRANCH, NEW YORK.

DRAFT-EQUALIZER.

SPECIFICATION forming part of Letters Patent No. 372,091, dated October 25, 1887.

Application filed June 22, 1887. Serial No. 242,088. (No model.)

*To all whom it may concern:*

Be it known that I, COE D. SMITH, of Smithtown Branch, county of Suffolk, and State of New York, have invented a new and useful Improvement in Draft-Equalizers for Vehicles and other Articles Drawn by Animals, of which the following is a specification.

My improvement relates to means for equalizing the draft between two animals harnessed together as a team.

I will describe in detail a draft-equalizer embodying my improvement, and then point out the novel features in a claim.

Figure 1:
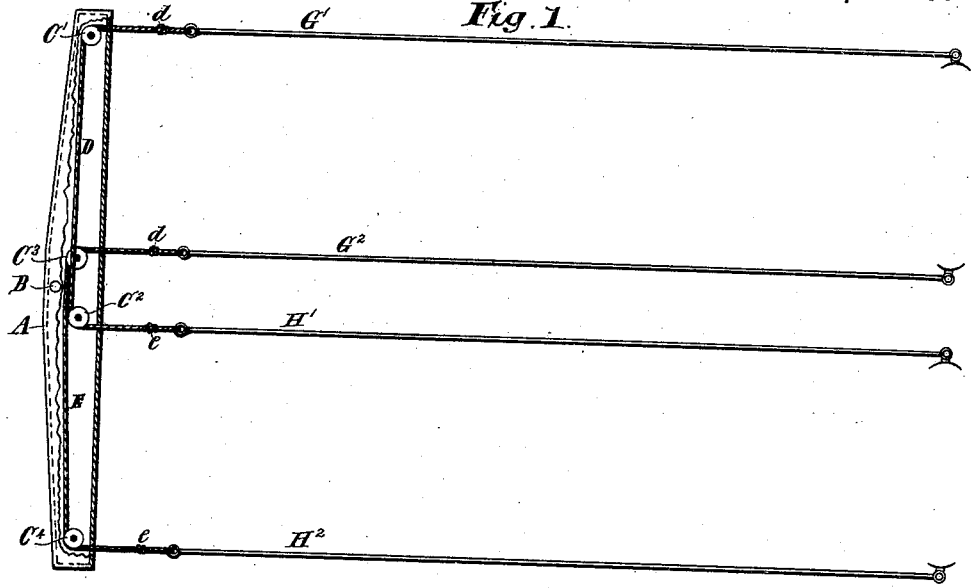
Figure 2:
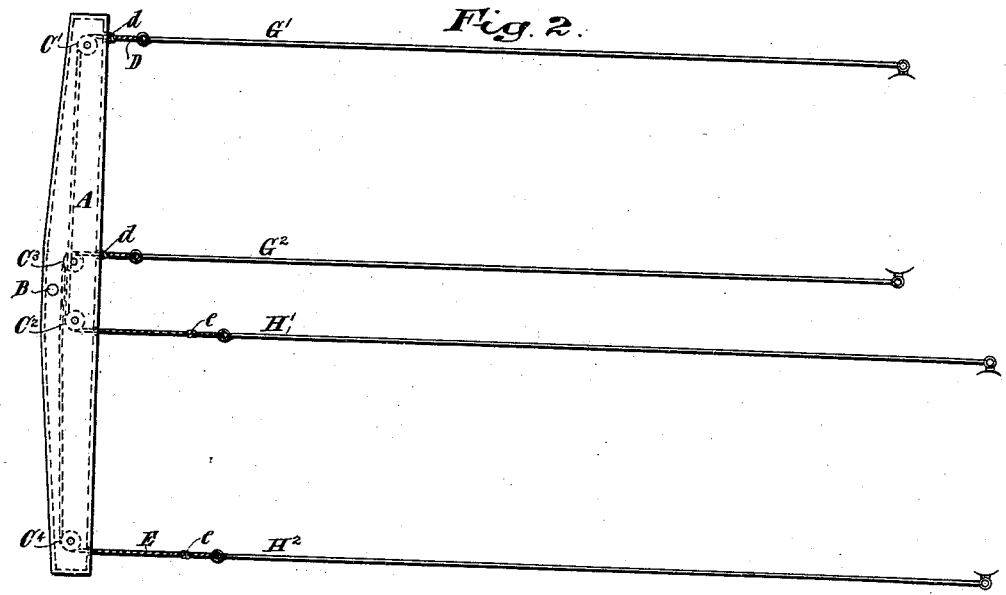
Figure 3:

In the accompanying drawings, Figure 1 is a plan or top view of a draft-equalizer embodying my improvement, certain portions being broken away to exhibit the features embodying the improvement. Fig. 2 is a plan or top view of this draft-equalizer, showing the parts in different positions. Fig. 3 is a front view of the bar and appurtenances thereof.

Similar letters of reference designate corresponding parts in all the figures.

A designates a bar, which may be made of any suitable material. It may be connected in any desirable manner to the vehicle or analogous article with which it is to be used. I have represented it as pivotally secured in place by a bolt, B, so that it may oscillate at the point of connection with the vehicle or other article. This bar is provided with pulleys or eyes (shown as four in number) $C'$ $C^2$ $C^3$ $C^4$. These may be arranged upon the bar in any desirable positions, and secured thereto in any approved manner.

I deem it preferable to construct the bar A so that it will be hollow, or will be provided with an internal cavity or cavities. For this reason I deem it advantageous to make it of iron or steel. I have represented it as thus made. When it is so made, the eyes or pulleys will occupy such positions that tackle D E may pass around them and extend through the cavity or cavities of the bar. It will be observed that these tackle at their inner ends extend past each other, and that they pass through suitable apertures in the front of the bar.

$G'$ $G^2$ and $H'$ $H^2$ designate traces for two draft-animals. These traces are connected to the end of the tackle D E.

It will be observed that the left trace $G'$ for the left or nigh animal is connected with one of the ends of the tackle D, that this tackle passes around the pulleys or eyes $C'$ $C^2$, through the bar A, and is connected with the left trace $H'$ of the right or off animal.

It will also be noticed that the right trace $G^2$ of the left or nigh animal is connected to one end of the tackle E, that this tackle passes around the pulleys or eyes $C^3$ $C^4$, and through the bar A, and is connected to the right trace $H^2$ of the right or off animal. Preferably the tackle D E will be provided with hooks or like devices to admit of the detachable connection of the traces to their ends. Said tackle may, however, be made part of the traces and as extensions thereof, and then the traces will be permanently connected to the bar A.

The traces $G'$ $G^2$ $H'$ $H^2$ may advantageously be made of flat leather in the ordinary manner; but the tackle will preferably consist of chains or ropes.

It will be seen that if one animal exerts a greater strain than the other, that strain will be transmitted to the other animal, and the latter be thereby caused to sustain it. Thus a lazy animal will be prevented from shirking its proper share of the work to be done.

Preferably the traces—or, as shown in the present example of my improvement, the tackle D E—will be provided with stops for limiting their movement relatively to the bar A. I have shown such stops as being formed by knots *d e* in the tackle. Such stops will be advantageous in preventing one animal from drawing the other animal back against the bar A.

My draft-equalizer is exceedingly simple, very effective, and withal cheap. It is particularly advantageous, because it will operate in such manner that not only will the draft be equally divided between two animals in a team, but the strain exerted by each animal will be exerted equally upon the two traces of such animal irrespective of any angle which the bar A may assume.

What I claim as my invention, and desire to secure by Letters Patent, is—

The combination, with a hollow bar having closed sides and apertures in its front side, of pulleys or eyes within the bar and secured thereto, and tackle extending through the apertures in the bar into the bar and around the pulleys or eyes, one of said tackle serving to connect the two left traces of two pairs of traces, and the other of such tackle serving to connect the two right traces of such pairs, the tackle being provided with stops, and the apertures in the bar being of sufficient size to admit the passage of the tackle but not the stops, substantially as specified.

COE D. SMITH.

Witnesses:
D. H. DRISCOLL,
M. J. ROACH.